United States Patent [19]

Armstrong et al.

[11] Patent Number: 4,995,685
[45] Date of Patent: Feb. 26, 1991

[54] METHOD AND SYSTEM FOR MAKING A REFLECTION HOLOGRAM

[75] Inventors: Mark L. Armstrong; Daniel J. Mickish, both of Wilmington, Del.

[73] Assignee: E. I. Du Pont de Nemours and Company, Wilmington, Del.

[21] Appl. No.: 352,505

[22] Filed: May 16, 1989

[51] Int. Cl.⁵ .............................................. G03H 1/02
[52] U.S. Cl. .................................. 350/3.65; 350/3.69; 350/3.78; 350/3.83
[58] Field of Search ...................... 350/3.6, 3.65, 3.69, 350/3.76, 3.78, 3.83

[56] References Cited

U.S. PATENT DOCUMENTS

| | | |
|---|---|---|
| 3,506,327 | 4/1970 | Leith et al. |
| 3,532,406 | 10/1970 | Hartman |
| 3,656,827 | 4/1972 | Gamblin et al. ................... 350/3.65 |
| 3,658,526 | 4/1972 | Haugh |
| 3,716,286 | 2/1973 | St. John et al. |
| 3,758,186 | 9/1973 | Brumm ............................. 350/3.69 |
| 3,838,903 | 10/1974 | Leith et al. |
| 3,894,787 | 7/1975 | Leith et al. |
| 4,209,250 | 6/1980 | James et al. |
| 4,411,489 | 10/1983 | McGrew ........................... 350/3.76 |
| 4,715,670 | 12/1987 | Turukhano ....................... 350/3.69 |
| 4,725,111 | 2/1988 | Weitzer et al. .................... 350/3.6 |

FOREIGN PATENT DOCUMENTS 1030793  5/1978  Canada.

OTHER PUBLICATIONS

"Copying Reflection Holograms," Journal of the Optical Society of America, vol. 58, pp. 856-857, Jun. 1968.
"Photography by Laser," Scientific American, vol. 212, No. 6, pp. 20 and 24-35, Jun. 1965.
"Volume Holography and Volume Gratings," Academic Press, Inc., Chapter 10, pp. 254-304, 1981.
"Photographic Reconstruction of the Optical Properties of an Object in Its Own Scattered Radiation Field," Soviet Physics-Doklady, vol. 7, No. 6, pp. 543-545, Dec. 1962.
"Holography," Encyclopedia of Physical Science and Technology, Academic Press, Inc., vol. 6, pp. 507-519, 1987.

Primary Examiner—Bruce Y. Arnold
Assistant Examiner—J. P. Ryan
Attorney, Agent, or Firm—John E. Griffiths

[57] ABSTRACT

The invention relates to a method and system for making reflection holograms and, more specifically, for making reflection holograms from a cylindrical surface of a master. Means are provided to direct substantially monochromatic actinic radiation through a recording medium sensitive to such radiation coupled to the cylindrical surface of the master such that the angle of incidence of the radiation on the master is substantially constant.

25 Claims, 5 Drawing Sheets

METHOD AND SYSTEM FOR MAKING A REFLECTION HOLOGRAM

BACKGROUND OF THE INVENTION

1. Field of the Invention.

This invention relates to a method and system for making reflection holograms and, more specifically, for making reflection holograms from a master having a cylindrical surface.

2. Description of Related Art.

Holography is a form of optical information storage. The general principles are described in a number of references, e.g., "Photography by Laser" by E. N. Leith and J. Upatnieks in *Scientific American,* 212. No. 6, pages 24–35 (Jun., 1965). A useful discussion of holography is presented in "Holography", by C. C. Guest, in *Encyclopedia of Physical Science and Technology.* Vol. 6, pages 507–519, R. A. Meyers, Ed., Academic Press, Orlando, Fla., 1987.

In brief, the object to be photographed or imaged is illuminated with coherent light (e.g., from a laser) and a light sensitive recording medium (e.g., a photographic plate) is positioned so as to receive light reflected from the object. This beam of reflected light is known as the object beam. At the same time, a portion of the coherent light is directed to the recording medium, bypassing the object. This beam is known as the reference beam. The interference pattern that results from the interaction of the reference beam and the object beam impinging on the recording medium is recorded in the recording medium. When the processed recording medium is subsequently appropriately illuminated and observed at the appropriate angle, the light from the illuminating source is diffracted by the hologram to reconstruct the wavefront that originally reached the recording medium from the object. Thus, the hologram resembles a window through which a real or virtual image of the object is observed in full three-dimensional form.

Holograms that are formed by allowing the reference and object beams to enter the recording medium from the same side are known as transmission holograms. Interaction of the object and reference beams in the recording medium forms fringes of material with varying refractive indices which are approximately normal to the plane of the recording medium. When the hologram is played back by viewing with transmitted light, these fringes refract the light to produce real and virtual images. Such transmission holograms may be produced by methods which are well known in the art, such as disclosed in U.S. Pat. Nos. 3,506,327, 3,838,903 and 3,894,787 issued to Leith and Upatnieks.

U.S. Pat. No. 4,209,250 discloses of system for making multiple copies from a stationary planar transmission master hologram. A copy medium is transported such that a portion of the copy medium is coupled to the master. Then a beam is directed through the master onto the copy medium exposing the copy medium portion. After exposure, the exposed portion of the copy medium is transported away from the master. This process is repeated to make multiple transmission hologram copies and is referred to as a step and repeat process.

Holograms formed by allowing the reference and object beams to enter the recording medium from opposite sides are known as reflection holograms. Interaction of the object and reference beams in the recording medium forms fringes of material with varying refractive indices which are, approximately, planes parallel to the plane of the recording medium. When the hologram is played back these fringes act as partial mirrors reflecting incident light back to the viewer. Hence, the hologram is viewed in reflection rather than in transmission.

Reflection holograms may be produced by an on axis or an off-axis method. Reflection holograms are produced by the on-axis method when the beam of coherent radiation is projected through the recording medium onto an object therebehind. In this instance, the beam reflected off the object returns and intersects with the projected beam in the recording medium to form fringes substantially parallel to the medium. The on-axis method of producing reflection holograms is described in an article by Yu N. Denisyuk entitled "Photographic Reconstruction of the Optical Properties of an Object in its Own Scattered Radiation Field," published in Soviet Physics—Doklady, 7, pgs. 543–5 (1962). Also see an article by Clark N. Kurtz entitled "Copying Reflection Holograms," published in the Journal of the Optical Society of America, 58, pgs. 856–7 (1968). Reflection holograms are produced by the off-axis method when a reference beam is projected on one side of the recording medium and an object beam is projected on the reverse side of the medium. In this instance, the object beam is formed by illuminating the object with coherent radiation which has not passed through the recording medium. For instance, the original beam of coherent radiation can be split into two portions, one portion being projected on the medium and the other portion being manipulated to project on the object behind the medium. Reflection holograms produced by an off-axis process are disclosed in U.S. Pat. No. 3,532,406.

The substantially horizontal fringes which form reflection holograms are much more difficult to record than the perpendicular fringes which form transmission holograms for two reasons. The first reason is the need for higher resolution, i.e., the need to record more fringes per unit length, and thus a need to record faithfully closer fringes. Horizontal reflection holograms require about three times to six times more fringes per unit length than do transmission holograms. The second reason relevant to photopolymers is the sensitivity of horizontal fringes to shrinkage of the recording medium during exposure Shrinkage of the recording medium during exposure will tend to wash out the fringes and, if severe, will prevent a hologram from being formed. This is in contrast to the transmission hologram case, where shrinkage has little or no effect when the fringes are substantially perpendicular or perpendicular to the plane of the medium, and produces only relatively minor image distortion if the transmission fringes are slanted more than 45° from the plane of the medium.

It is an object of this invention to provide a system capable of making reflection holograms by an on-axis method from a cylindrical master.

It is another object of this invention to provide a system capable of making reflection holograms in a continuous fashion, in addition to a step and repeat manner.

SUMMARY OF THE INVENTION

The present invention is related to a system for making a reflection hologram comprising:

a master having a cylindrical surface symmetric about an axis;

a holographic recording medium capable of undergoing a change when exposed to radiation and when coupled to the master cylindrical surface; and means for directing substantially coherent radiation through the recording medium to the master cylindrical surface, the directing means including means for focusing the radiation so that the angle of incidence of the radiation on the master is substantially constant.

The invention is further related to a method of making a reflection hologram comprising the steps of:

coupling a holographic recording medium to a cylindrical surface of a master; and directing a reference beam of substantially coherent radiation through the holographic recording medium to the cylindrical surface of the master so that the angles of incidence of the radiation on the master are substantially constant to expose the recording medium by the reference beam and by an object beam which is the reference beam reflected or diffracted from the master.

BRIEF DESCRIPTION OF THE DRAWINGS

The invention can be more fully understood from the following detailed description thereof in connection with accompanying drawings which form a part of this application and in which:

FIG. 5b is a schematic illustration of a side view of the system illustrated in FIG. 5a.

DESCRIPTION OF THE PREFERRED EMBODIMENT(S)

Throughout the following detailed description, similar reference numerals refer to similar elements in all Figures of the drawings.

Figure 1:
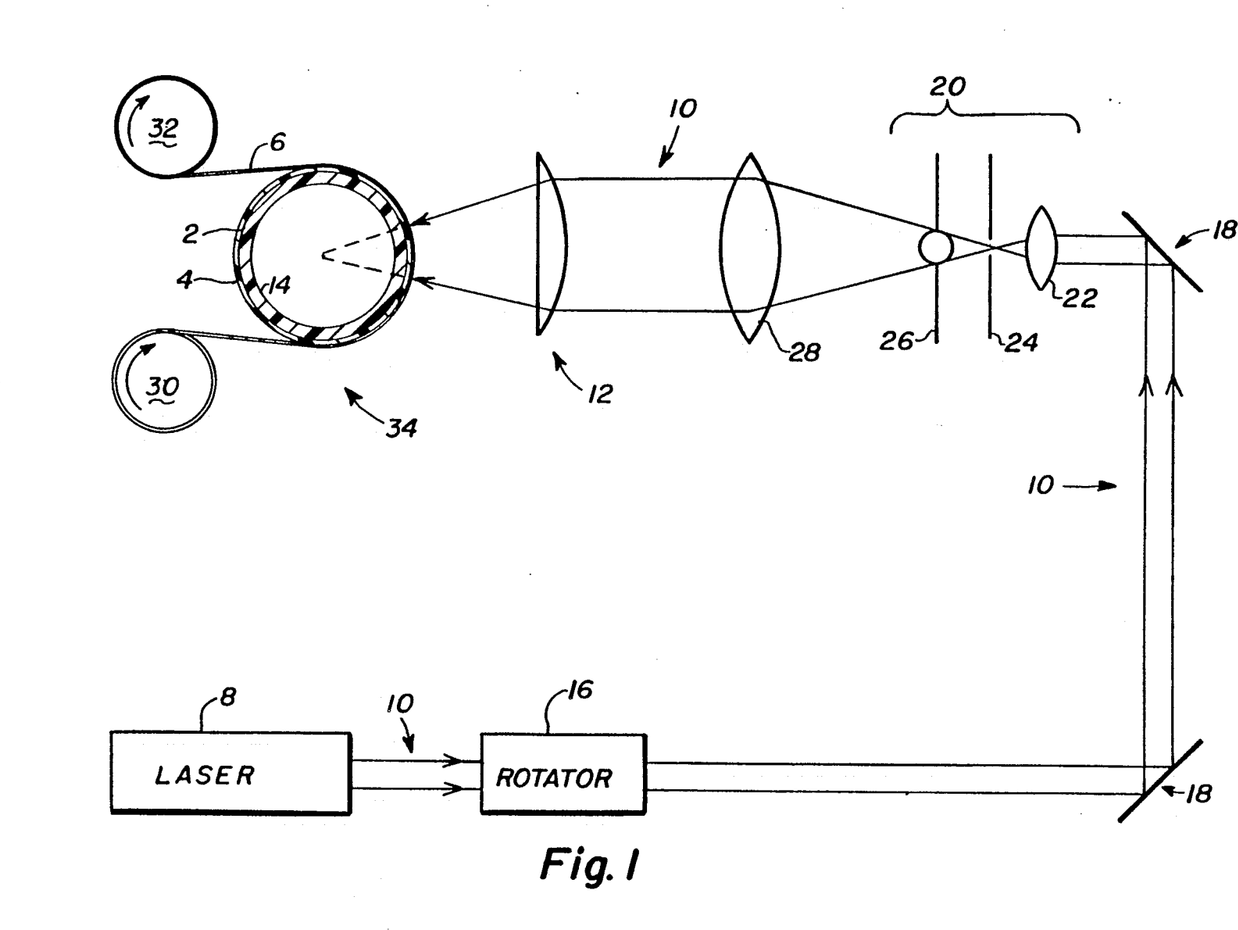
FIG. 1 is a schematic illustration of a system for making a reflection hologram, the system including a first embodiment of focusing means, in accordance with the present invention.

Referring to FIG. 1, there is a schematic illustration of a system for making a reflection hologram in accordance with the present invention. The system comprises a master 2 having a cylindrical surface 4, a holographic recording medium 6 capable of undergoing a chemical or physical change when exposed to substantially coherent radiation (e.g., actinic, electromagnetic, acoustic, etc.) coupled to the cylindrical surface 4 of the master 2, a source 8 for emitting a beam 10 of the substantially coherent radiation, and means for focusing 12 the beam 10 through the recording medium 6 to the master 2 such that the angles of incidence of rays of the beam on the master 2 are substantially constant. For the purposes of this invention, the words "substantially constant" are intended and defined to include the situation where the angles of incidence of the rays of the beam on the master are exactly constant.

The master 2 must be at least partially reflective and/or diffractive which, as a practical matter, means it can be made of virtually any material. The master 2 must have a cylindrical surface 4 that can be, for instance, a cylindrical surface of a cylinder 14, a coating or layer 2 on a cylindrical surface of a cylinder 14, a mirror or a hologram. One illustration of a suitable master is a metalized film, such as an aluminized polyester (e.g., Mylar ®) film. The metalized film may contain, in or on the film, an embossed or raised relief hologram.

The recording medium 6 used herein can be made of a variety of materials. Among the more important are: silver halide emulsions, dichromated gelatin, thermoplastics, ferroelectric crystals, photopolymers, photochromics, photoresists and photodichroics. Characteristics of these materials are given in *Volume Holography and Volume Gratings*, by L. Solymar and D. J. Cook, Chapter 10, Academic Press, N.Y., 1981, pp. 254–304. The recording medium 6 is preferably a silver halide emulsion or a film made of a photohardenable composition which upon exposure to actinic radiation forms crosslinks or polymers of higher molecular weight to change the refractive index and rhelogical character of the composition. Preferred photohardenable compositions are photopolymerizable compositions, such as disclosed in U.S. Pat. No. 3,658,526 and more preferred materials are described in commonly assigned U.S. Pat. application Ser. Nos. 07/144,355 and 07/144,840, both filed on Jan. 15, 1988, and U.S. Pat. Ser. No. 07/288,916 filed Dec. 23, 1988, all of which are incorporated herein by reference. The photohardenable film may have a protective film, such as a sheet of polyester (e.g., Mylar ®), on one or both sides of the photohardenable film. In addition, the photohardenable film may be coated on, or laminated to, a metalized coating on a film. As noted in the preceding paragraph, the metalized coating may contain, on or in the film, an embossed or raised relief hologram. Then both the master 2 and the recording medium 6 could be wound and rotated around the cylinder 14 at the same time. See FIG. 5b.

The source 8 for emitting a beam 10 of substantially coherent radiation can be a laser. Preferably, the laser emits a beam of light having a circular cross section that is substantially collimated, coherent, monochromatic and polarized. The choice of laser depends on the wavelength to which the recording medium 6 has been sensitized. For instance, the source 8 can be an argon ion laser, such as laser model I-100-20 made by Coherent Inc. located in Palo Alto, Calif., when the recording medium 6 has been sensitized to chemically change when exposed to blue green light. However, beams having other cross sectional shapes may be used such as a beam having a substantially collimated elliptical or elongated rectangular shaped cross section.

The means for focusing 12 directs the beam 10 through the recording medium 6 to the master 2 such that the angles of incidence of rays of the beam on the master 2 are substantially constant which as previously stated includes the situation where they are constant.

The light source 8 and the focusing means 12 function as means for directing substantially coherent radiation through the recording medium 6 to the master cylindrical surface 4.

Preferably, the angle of incidence of all rays of the beam 10 intersecting the cylindrical surface 4 of the master 2 will be constant. This condition makes the resulting reflection hologram the closest to the master original.

In general, in order to focus the rays of the beam 10 such that all of the rays are constant on the cylindrical surface 4 of the master 2, the focusing means 12 can comprise (1) an acylindrical or aspheric cylindrical lens, (2) an acylindrical or aspheric cylindrical mirror, (3) an holographic element that is designed to function like either (1) or (2), or (4) other equivalent devices. In addition, a cylindrical achromatic lens or an equivalent device may focus the rays of the beam 10 to the axis of rotation of the cylinder 14 such that all of the rays intersect the cylindrical surface 4 at a constant angle. Each of these focusing means 12 is only capable of providing a constant angle of incidence for one particular angle. In other words, a different one of these lenses, elements or devices 12 is needed for each desired angle of incidence. If these particular focusing means 12 are not positioned correctly with respect to the master 2, then the angles of incidence of rays of the beam on the master 2 will vary. In such a case, the rays of the beam on the master 2 can still be substantially constant. Persons of ordinary skill in the art can make these lenses given certain factors, such as the lens aperture, the beam diameter or the maximum beam diameter that will be used, the intended function of the lens (that is, to focus the beam 10 through the recording medium 6 to the master 2 such that the angles of incidence of rays of the beam on the master 2 are constant) and the desired angle of incidence of the rays on the master. These types of lenses 12 typically have to be made to order increasing their cost.

Other lenses or devices can be used for the focusing means 12 which do not focus the rays of the beam 10 such that all of the angles of incidence of the rays are constant on the cylindrical surface 4 of the master 2, but still do focus the rays such that the angles of incidence of the rays of the beam 10 on the master 2 are substantially constant. Illustrative examples of such other lenses or devices 12 include (1) a cylindrical planoconvex lens, (2) an achromatic cylindrical lens, (3) a best form cylindrical lens, (4) an holographic element that is designed to function like a cylindrical plano-convex lens, an achromatic cylindrical lens or a best form cylindrical lens, (5) a cylindrical mirror or (6) other equivalent devices. These particular focusing means 12 focus or substantially focus the beam 10 of light to a focal line within the master cylindrical surface 4. These lenses 12 are typically less expensive and easier to make than the lenses that can focus the beam such that the angles of incidence of rays of the beam on the master 2 are exactly constant.

The diameter of the focusing means 12 should be greater than or equal to the width of the desired imaging area, the width being parallel to the master cylindrical surface rotational axis.

If the angle of incidence, 100, of the rays or the beam 10 cannot be or are not constant on the master surface 4, then it is preferred to minimize the root mean square deviation, $\Delta\phi$, from the desired angle of incidence, $\phi$, or at least to reduce this deviation, $\Delta\phi$, to below an acceptable limit. As long as the deviation, $\Delta\phi$, is less than or equal to about five degrees (5°) then acceptable reflection holograms can be made. Further, it is preferred that the root mean square deviation from the desired angle of incidence, $\Delta\phi$, be less than or equal to about one degree (1°). Therefore, for the purpose of this disclosure, a deviation, $\Delta\phi$, of about five degrees (5°) or less, and preferably about one degree (1°) or less, is defined as substantially constant.

As stated above, the focusing means 12 that do not focus the rays of the beam 10 such that all of the angles of incidence of the rays are constant on the cylindrical surface 4 of the master 2, but still do focus the rays such that the angles of incidence of the rays of the beam 10 on the master 2 are substantially constant, substantially focus the beam to a focal line. Certain generalizations can be made concerning preferred positions for this focal line. First, the focal line should be under the master cylindrical surface and parallel to or coincident with the axis of the master cylindrical surface 4.

Figure 2:
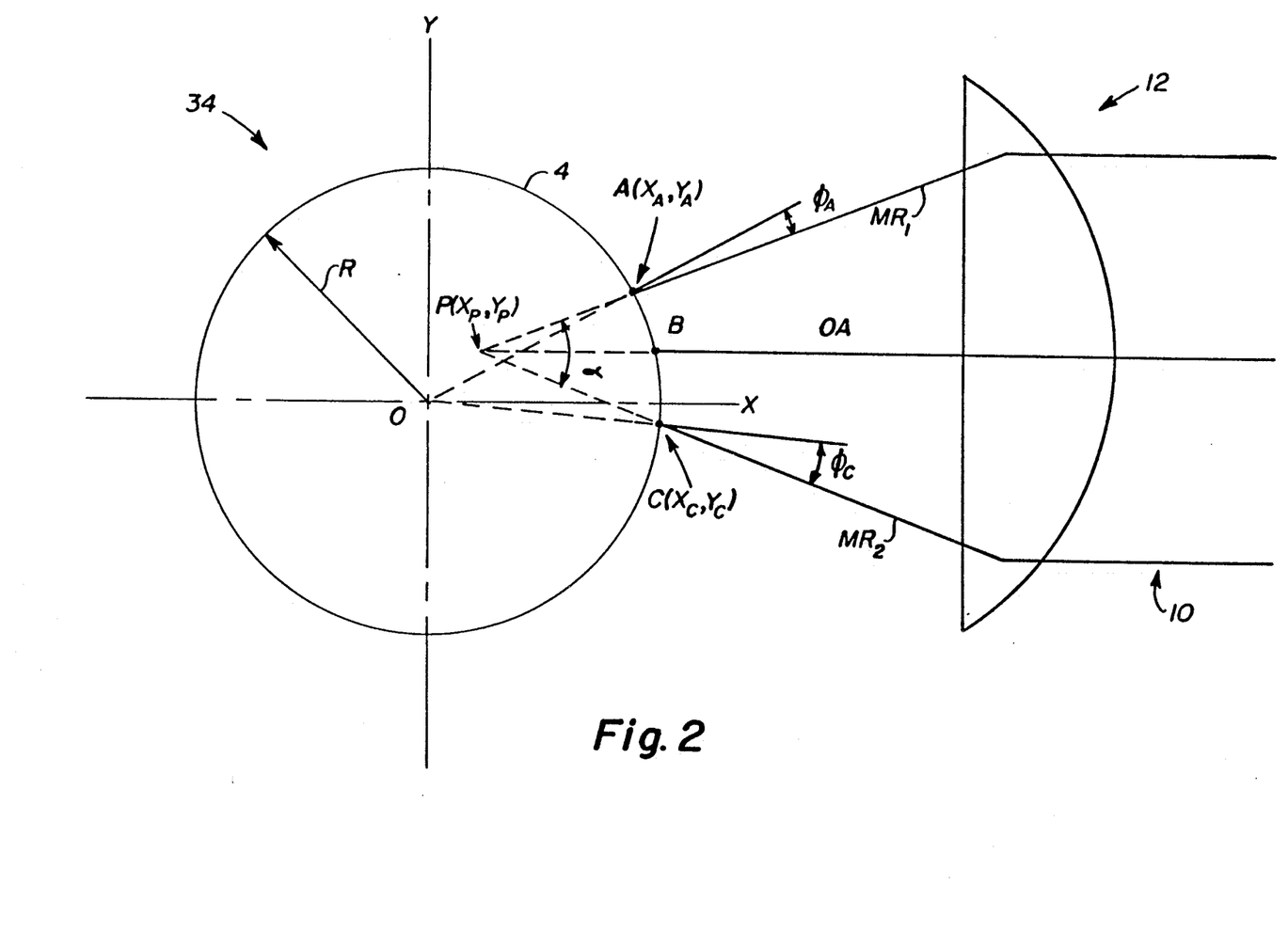
FIG. 2 is a side view of a part of a holographic recording station and focusing means identifying various variables.
Figure 3:
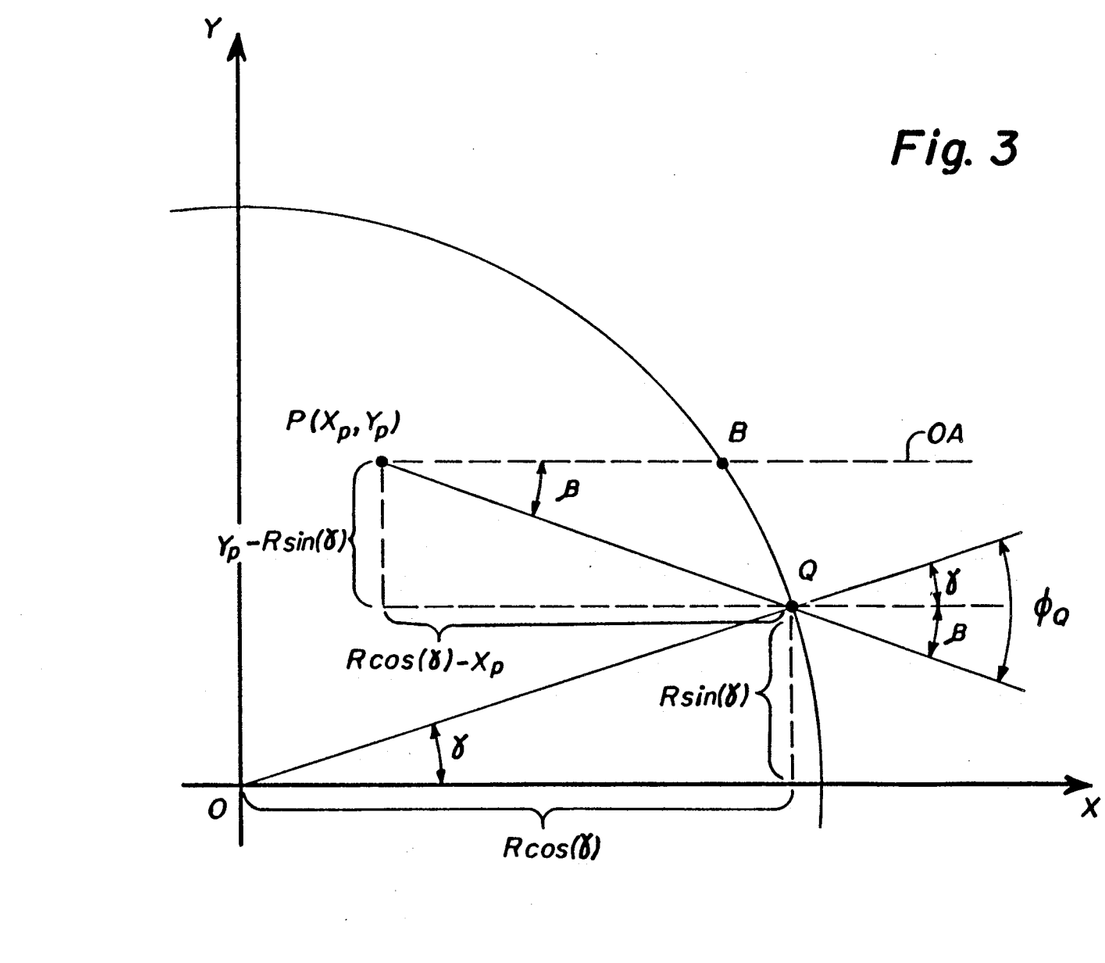
FIG. 3 is an enlarged portion of the view in FIG. 2.

FIGS. 2 and 3 illustrate a schematic side view of one possible orientation of a holographic recording station 34 with respect to a focusing means 12 to help describe other generalizations concerning preferred positions for the focal line, to explain what factors influence the deviation, $\Delta\phi$, and to explain how to minimize the deviation, $\Delta\phi$, or reduce the deviation, $\Delta\phi$, to below the acceptable limit. The following discussion may refer to the structure in FIGS. 2 and 3 in two dimensional terms, but it is to be understood that the structure is three-dimensional extending perpendicular to the page. For ease of understanding, the focusing means 12 is assumed to focus the collimated beam 10 to a line. In practice, this may be accomplished by using an achromatic spherical lens as the collimating means 28 and an achromatic cylindrical lens as the focusing means 12.

Referring to FIG. 2, the outer cylindrical surface 4 of the master has a radius R. The surface 4 is centered about a point 0 on an X, Y and Z coordinate system where the X, Y and Z axes are perpendicular to one another, the X and Y axes lie on the drawing page and the Z axis is perpendicular to the page. A polar coordinate system is also established with its pole at the intersection of the X and Y axes with 0° being in the positive X direction and 90° being in the positive Y direction. The beam 10 of light is focused by the focusing means 12 to a line through a focal point $P(x_p, y_p)$ and perpendicular to the drawing page. The lens 12 has an optical axis OA which is parallel to the X axis and intersects the focal point $P(x_p, y_p)$ and the master cylindrical surface 4 at a point B. The extreme rays of the beam 10, i.e., the highest and lowest set of rays depicted in FIG. 2, are referred to as the marginal rays $MR_1$ and $MR_2$, respectively. The highest set of marginal rays $MR_1$ intersects the master cylindrical surface 4 at a point A. The lowest set of marginal rays $MR_2$ intersects the master cylindrical surface 4 at point C. The incident angle of each of the sets of rays on the master surface 4 which is the angle between the incident ray, e.g., $MR_1$, and a line passing through the point 0 and the intersection point on the master cylindrical surface 4 with the incident ray, e.g., point A, is designated $\phi$. As stated above, preferably $\phi$ is the same for each ray in the beam 10, but it is within the scope of this invention for $\phi$ to be substantially the same for each ray in the beam 10.

The angle between the intersecting marginal rays $MR_1$ and $MR_2$ is designated $\alpha$ which is related to the focal ratio (f/), a characteristic of the lens, as follows:

$$\alpha/2 = \text{Arctan}\left[\frac{1}{2f/}\right] \qquad \text{Equation (1)}$$

FIG. 3 is an enlarged view of part of FIG. 2 showing a point Q on the surface 4 of the master 2 defined as between or including points A and C. The angle of incidence of the ray passing through point Q is designated $\phi_Q$ which is equal to an angle $\gamma$ plus an angle $\beta$, $\gamma$ being the angle between the X axis and a line passing through the points Q and O, and β being the angle between rays PB and PQ.

To determine where one should position or locate the focal line, it is necessary to minimize the root mean square deviation, Δφ, from the desired angle of incidence, φ. The root mean square deviation, Δφ, and the desired angle of incidence, φ, are defined as a function of γ as follows:

$$\Delta\phi = \sqrt{\frac{\int_{\gamma_{min}}^{\gamma_{max}} I(\gamma)[\phi_Q(\gamma) - \phi]^2 \, d\gamma}{\int_{\gamma_{min}}^{\gamma_{max}} I(\gamma) \, d\gamma}} \quad \text{Equation (2)}$$

and $$\phi = \int_{\gamma_{min}}^{\gamma_{max}} I(\gamma)\phi_Q(\gamma) d\gamma \bigg/ \int_{\gamma_{min}}^{\gamma_{max}} I(\gamma) \, d\gamma \quad \text{Equation (3)}$$

where I(γ) represents the intensity of the beam 10 as a function of the angle γ.

Further, it can be shown that φ_Q can be described as a function of γ as follows:

$$\phi_Q = \gamma + \arctan\left[\frac{y_P - R\sin(\gamma)}{R\cos(\gamma) - x_P}\right] \quad \text{Equation (4)}$$

Equation 4 is valid when:

$$\gamma_{min} \leq \gamma \leq \gamma_{max} \quad \text{Equation (5)}$$

where $$\gamma_{min} = \text{Arcsin}\left[\frac{y_C}{R}\right] \quad \text{Equation (6)}$$

and $$\gamma_{max} = \text{Arcsin}\left[\frac{y_A}{R}\right] \quad \text{Equation (7)}$$

Minimization of Δφ is accomplished by (A) substituting φ_Q from Equations 4, 6 and 7 into Equation 2, (B) taking the derivative of Δφ with respect to x_P and the derivative of Δφ with respect to y_P and (C) then setting the derivatives to zero. This results in the following Equations 8 and 9.

$$\frac{\partial}{\partial x_P} \Delta\phi = 0 \quad \text{Equation (8)}$$

$$\frac{\partial}{\partial y_P} \Delta\phi = 0 \quad \text{Equation (9)}$$

The solutions for xP and yP from simultaneous Equations (8) and (9) give the preferred position of the focal line P(x_P, Y_p).

In practice, the characteristics of the cylinder and the lens 12 become fixed as soon as the particular cylinder and lens are chosen This fixes R and f/. In other words, an individual typically will only have one cylinders 14 and one lens 12 or a limited number of cylinders 14 and lenses 12 from which that individual will want to make reflection holograms using different masters. Each master may require the rays of the reference beam 10 to have a different preferred or desired angle of incidence, i.e., 25°, 33°, etc.

In the case where I(γ) is constant, xP equal to zero gives the minimum deviation, Δφ, for all desired incident angles, φ. Table I gives a few optimum results for the constant I(γ) case, where fixed values for R and f/ were assumed to be 2 inches (0.051 meters) and 6, respectively.

TABLE I

| φ (degrees) | x_p (inches) | y_p (inches) | Δφ (degrees) | Range φ_{Qmax} minus φ_{Qmin} (degrees) |
|---|---|---|---|---|
| 0 | 0 | 0 | 0 | 0 |
| 22.5 | 0 | .77 | .03 | .08 |
| 45 | 0 | 1.42 | .06 | .20 |
| 60 | 0 | 1.73 | .11 | .34 |
| 70 | 0 | 1.88 | .18 | .54 |
| 80 | 0 | 1.97 | .40 | 1.11 |

The numbers for the case illustrated in Table I deviation, Δφ, is lower than one degree for all desired angles of incidence, φ. This data indicates that when the optical axis OA is parallel or coincident with the x axis, then it is best to position the focal line such that it intersects the y axis, i.e., x=0. Phrased another way, it is preferred for the focal line to be in a plane that contains the axis of the master cylindrical surface 4 and that is perpendicular to the optical axis of the focusing means 12.

The solutions for xP and yP can vary from those given above when the intensity I(γ) is not constant. It is within the scope of this invention for the intensity of the beam, I(γ), on the master cylindrical surface, to include a small intensity variation due to the projection of the incident beam on the master cylindrical surface over the range of incident angles φ_{Qmax} through φ_{Qmin} {i.e., I(γ)=cos[φ_Q(γ)]}, and to include any non-uniform (e.g., Gaussian) distribution G(γ) of the beam across its cross section {e.g., I(γ)=cos[φ_Q(γ)]G(γ)}.

Figure 5A:
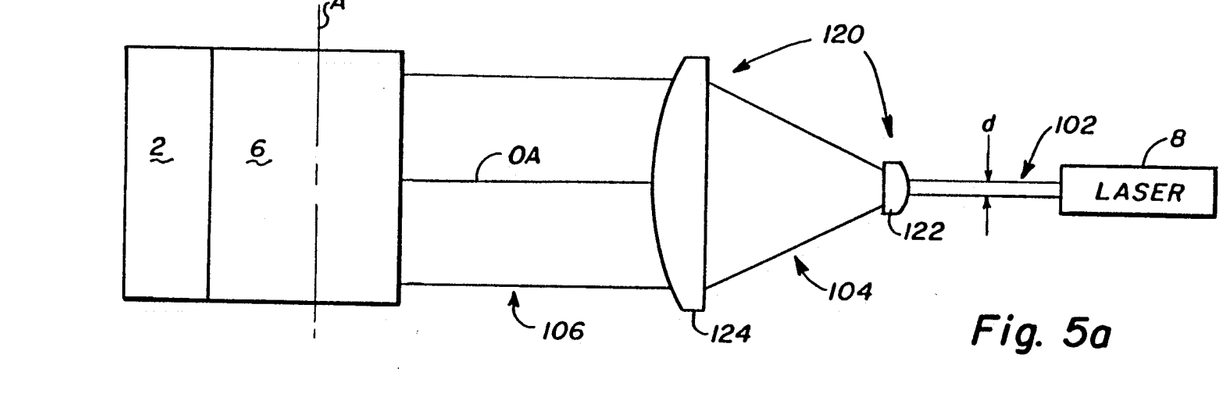
FIG. 5a is a schematic illustration of a top view of a second system for making a reflection hologram, the system including a second embodiment of focusing means, in accordance with the present invention.
Figure 5B:
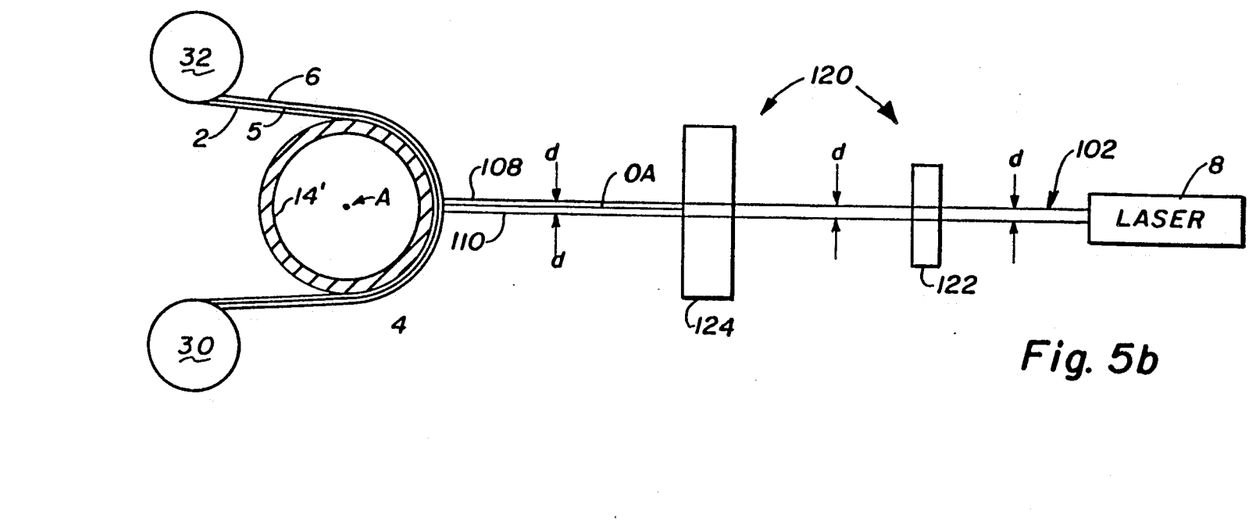

FIGS. 5a and 5b relate to a system for making a reflection hologram, the system including a second embodiment of focusing means 120, in accordance with the present invention. FIG. 5a is a schematic illustration of a top view of the system. FIG. 5b is a schematic illustration of a side view of the system.

The second system can be the same as the first system, except its focusing means 120 comprises a first cylindrical lens 122 and a second cylindrical lens 124. The first cylindrical lens 122 functions as means for receiving a pencil beam 102 of the radiation from the laser 8 and expanding the beam 102 in one dimension forming a diverging fan shaped beam 104. The second cylindrical lens 124 functions as means for receiving the expanding or diverging fan shaped beam 104 from the first cylindrical lens 122 and collimating the expanding fan shaped beam 104 forming a collimated curtain shaped beam 106. The collimated curtain shaped beam 106 is usually directed through the recording medium 6 onto the master cylindrical surface 4 such that the optical axis OA is substantially perpendicular to the axis of rotation, A, of the master cylindrical surface 4. The optical axis OA can intersect or be spaced from the axis of rotation, A, of the master cylindrical surface 4. Further, the angle of incidence, φ, of the beam on the master cylindrical surface 4 can be varied by changing the distance between the optical axis OA and the axis of rotation, A, of the master cylindrical surface 4. In this second system illustrated in FIGS. 5a and 5b, the optical axis OA of the collimated curtain beam 106 may, or may not, be perpendicular to the axis of rotation, A, of the master cylindrical surface 4.

The cross section of the pencil beam 102 from the laser 8 is circular having a diameter, d. The expanding or diverging fan shape beam 104 and the collimated curtain shaped beam 106 also have a thickness or distance, d, from their top surface 108 to their bottom surface 110.

In the embodiment illustrated in FIGS. 5a and 5b, as long as the thickness or distance, d, is sufficiently thin or short, the focusing means 120 will focus the beam 100 through the recording medium 6 to the master 2 such that the angles of incidence of rays of the beam on the master 2 are substantially constant. As explained with respect to the embodiment illustrated in FIG. 1, for the purpose of the embodiment illustrated in FIGS. 5a and 5b, as long as the deviation, $\Delta\phi$, is less than or equal to about five degrees (5°) then acceptable reflection holograms can be made. Further, it is preferred that the root mean square deviation from the desired angle of incidence, $\Delta\phi$, be less than or equal to about one degree (1°).

Referring again to FIG. 1, if the light source 8 emits polarized light, then the system preferably includes a polarization rotator 16 that can be located any where along the path of the beam 10. In FIG. 1, the rotator 16 is depicted adjacent the light source 2. The rotator 16 can be used to condition the light for a preferred polarization orientation.

To conform to space requirements, means for steering 18 the beam 10 may be included to redirect the beam 10. The steering means 18 may include mirrors including holographic mirrors, prisms or beam splitters.

The system may optionally include means for spatially filtering 20 unwanted light from the beam 10. The filtering means 20 may include a lens system 22, such as a microscope objective lens system, for focusing the beam to a point and then through a pin hole 24 to block scattered light that does not pass through the spatial filter. The filtering means 20 may also include an iris diaphragm 26 with an adjustable aperture located to allow the desirable portion of the beam diverging from the spacial filter 24 to pass through it.

If the system includes a filtering means 20 including a spherical lens 22 that focuses the beam 10 to a point, then the system will need means for collimating 28 the diverging beam 10 from the point The diameter of the collimating means 28 should be greater than or equal to the width of the desired imaging area, the width being parallel to the master cylindrical surface rotational axis. Illustrative collimating means include a spherical lens, an aspheric lens, a spherical mirror or a parabolic mirror The collimating means 28 can direct the collimated beam 10 to the focusing means 12.

The recording medium 6 can be wrapped around the master cylindrical surface 4 or transported by any means to and away from the master cylindrical surface 4. FIG. 1 shows that unexposed recording medium 6 can be wound on a supply roll 30, transported to be in contact with the master cylindrical surface 4, and then exposed recording medium 6 can be wound on windup roll 32. FIG. 5b shows that unexposed recording medium 6 laminated to a master 2 comprising a metalized coating 5 on a film can be wound on the supply roll 30, transported to be in contact with the cylinder 14 forming a cylindrical surface 4 in the master 2, and then exposed recording medium 6 along with the master 2 can be wound on the windup roll 32.

Figure 4:
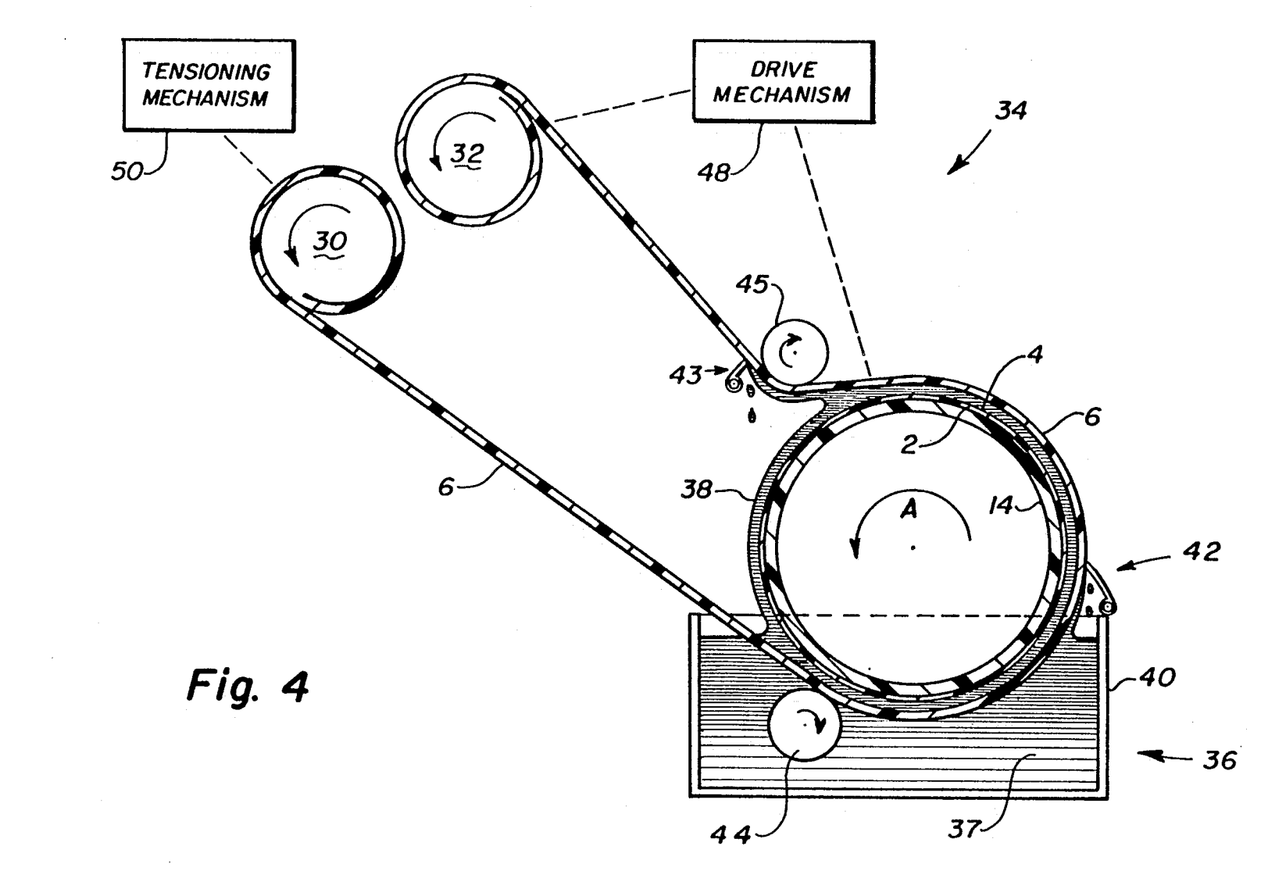
FIG. 4 is a detailed schematic illustration of a holographic recording station which is capable of being used in the system of FIG. 1.

Referring to FIG. 4, there is depicted a detailed schematic illustration of a preferred embodiment of a holographic recording station 34 for use in the present invention.

The holographic recording station 34 comprises the cylinder 14, the supply roll 30 and the windup roll 32 positioned such that when the recording medium 6 is pulled off the supply roll 30 onto the windup roll 32, a portion of the recording medium 6 wraps around a portion of the cylindrical surface 4.

The station 34 may further comprise means for applying 36 a coupling liquid 37, such as xylene, with a refractive index matched to optically couple and minimize reflections between the recording medium 6 and the master 2 prior to exposure. The applying means 36 may be a tank 40 positioned under the cylinder 14, such that, when the tank 40 has liquid in it, a portion of the cylinder 14, the master 2 and the recording medium 6 dip into the liquid 37 allowing the liquid 37 to flow between the master 2 and the recording medium 6. Under these conditions, when the cylinder 14 is rotated, in the direction of arrow A in FIG. 2, transporting the master 2 and the recording medium 6, a layer 38 of the liquid 37 becomes trapped between and, thereby, optically coupling the master 2 and the recording medium 6 during exposure.

Means for removing 42 the liquid 37 from the outer surface of the recording medium 6 should be provided prior to exposure. The removing means 42 can be any device, such as a wiper or roll. The system may include means for removing 43 the liquid 17 from one or both sides of the recording medium 6 after exposure and before it is wound on the windup roll 32. Again, the removing means 43 can be any device, such as a wiper or roll.

Alternatively, the liquid can be dripped, sprayed, rolled or otherwise applied from a device to the master 2 and/or the recording medium 6 in the vicinity of where they come into contact with one another.

Certain recording mediums 6 are inherently capable of optically coupling to the master 2 without the need for a coupling liquid. For instance, a tacky recording medium 6 has been shown to adequately couple to a master, such as a metalized polyester film, without the need for a coupling liquid.

Positioning rolls 44 and 45 may be located to direct the path of the recording medium and ensure proper coupling of the recording medium 6 to the master 2 at the exposure area. If a tank 40 of liquid 37 is used as described above, one of the positioning rolls 44 can be submersed in the liquid 37 in the tank 40 to additionally meter the thickness of the liquid layer 38 between the master 2 and the recording medium 6 during exposure.

A controllable drive mechanism 48 is provided to transport the recording medium 6 from the supply roll 30 around and turn the cylinder 14 to the windup roll 32. Preferably, the drive mechanism is operable at variable speeds and for variable durations. The drive mechanism may comprise a motor connected directly to the windup roll by the motor axle or an extension thereof. Otherwise the motor may be connected by gears, gears and chains, belts or equivalent devices to the windup roll and/or the exposed recording medium 6.

A tensioning mechanism 50 may optionally be connected, such as, to the supply roll 30 or the recording medium 6 to control the tension of the recording medium 6 and prevent excess recording medium 6 from unwinding from the supply roll 30.

In operation, reflection holograms are made using the described system as follows.

First, the holographic recording medium 6 is coupled to the cylindrical surface 4 of the master 2. Then the reference beam 10 is directed through the holographic recording medium 6 to the cylindrical surface 4 of the master 2 so that the angle of incidence of rays of the beam 10 on or intersecting the master 2 are substantially constant to expose the recording medium 6 by the reference beam 10 and by an object beam which is the reference beam reflected and refracted from the master 2.

The holographic recording medium 6 and the master 2 can be rotated about an axis (1) simultaneously with directing the reference beam 10 through the recording medium 6 or (2) the directing and rotating steps can occur alternately.

The reference beam 10 is preferably focused such that it focuses substantially to a focal line which is substantially parallel to or the same as the axis of the master cylindrical surface. Preferably, the focal line substantially lies in a plane that contains the axis of the master cylindrical surface 4 and is perpendicular to the optical axis OA of the means for focusing 12 the beam.

Those skilled in the art, having the benefit of the teachings of the present invention as hereinabove set forth, can effect numerous modifications thereto. These modifications are to be construed as being encompassed within the scope of the present invention as set forth in the appended claims.

What is claimed is:

1. A system for making a reflection hologram comprising:
    an at least partially reflective or diffractive master having a cylindrical surface symmetric about an axis;
    a holographic recording medium coupled to the master cylindrical surface; and
    means for directing a reference beam of substantially coherent radiation through the recording medium to the master cylindrical surface, the directing means including means for focusing the radiation so that the angle of incidence of the radiation on the master is substantially constant,
    such that when the directing means directs the reference beam through the recording medium, an object beam reflects off the master and passes back through the recording medium interfering with the reference beams forming a reflection hologram in the recording medium.

2. The system of claim 1, wherein the master comprises a polyester film with a metalized coating.

3. The system of claim 2, wherein the recording medium comprises a photohardenable film coated on, or laminated to, the metalized coating.

4. The system of claim 1, wherein the recording medium comprises a silver halide emulsion or a film made of a photohardenable composition.

5. The system of claim 1, further comprising:
    means for rotating the master cylindrical surface about the axis.

6. The system of claim 5, further comprising:
    means for storing an unexposed portion of the recording medium; and
    means for receiving an exposed portion of the recording medium,
    whereby the rotating means transports unexposed recording medium from the storing means to the cylindrical surface for exposure by the directing means and then transports the exposed recording medium to the receiving means.

7. The system of claim 5, wherein the rotating means is for continuously rotating the master cylindrical surface while the recording medium is being exposed by the directing means.

8. The system of claim 5, wherein the rotating means is for rotating the master cylindrical surface to position the recording medium for exposure and the master cylindrical surface is not rotating while the recording medium is being exposed.

9. The system of claim 1, further comprising:
    means for optically coupling the recording medium to the master.

10. The system of claim 9, wherein the coupling means comprises:
    means for applying a liquid with a refractive index matched to optically couple the recording medium and the master prior to exposure; and
    means for removing excess liquid from between the master and the recording medium prior to exposure and for removing liquid from a surface of the recording medium farthest from the master prior to exposure.

11. The system of claim 1, wherein the focusing means is for focusing the radiation substantially to a line which is substantially parallel to or coincident with the axis of the master cylindrical surface.

12. The system of claim 1, wherein the focusing means is for focusing the radiation substantially to a line parallel to or coincident with the axis of the master cylindrical surface and substantially in a plane that is perpendicular to an optical axis of the means for focusing the beam.

13. The system of claim 1, wherein the focusing means is for focusing the radiation substantially to a line parallel to or coincident with the axis of the master cylindrical surface and substantially in a plane that is perpendicular to an optical axis of the means for focusing the beam and contains the axis of the master cylindrical surface.

14. The system of claim 1, wherein the focusing means comprises:
    means for expanding a beam of the radiation in one dimension forming a diverging fan beam; and
    means for receiving the diverging fan beam from the expanding means and collimating the diverging fan beam forming a collimated curtain beam for directing through the recording medium to the master cylindrical surface.

15. The system of claim 1, wherein the focusing means is for focusing the radiation such that the difference between the maximum angle of incidence and the minimum angle of incidence of the radiation on the master is less than or equal to about five degrees.

16. The system of claim 1, wherein the directing means further comprises:
    a laser for emitting the radiation comprising at least substantially collimated, coherent, monochromatic and polarized light;
    a variable polarizer for selecting a preferred polarization for the light;
    a first spherical lens for expanding the light; and a second spherical lens for collimating the expanded light and for directing the collimated, expanded light to the focusing means.

17. The system of claim 16, wherein the directing means further comprises:
    means for steering the light; and
    a spatial filter for reducing nonuniformities in the light.

18. A method of making a reflection hologram comprising the steps of:
    coupling a holographic recording medium to a cylindrical surface of an at least partially reflective or diffractive master; and
    directing a reference beam of substantially coherent radiation through the holographic recording medium to the cylindrical surface of the master so that the angles of incidence of the radiation on the master are substantially constant to expose the recording medium by the reference beam and by an object beam which is the reference beam reflected or diffracted from the master.

19. The method of claim 18, further comprising the step of:
    rotating the holographic recording medium coupled to the cylindrical surface of master about an axis.

20. The method of claim 19, wherein the directing and rotating steps occur simultaneously.

21. The method of claim 19, wherein the directing and rotating steps occur alternately.

22. The method of claim 18, further comprising the step of:
    focusing the reference beam substantially to a line which is substantially parallel to or coincident with an axis of the master cylindrical surface.

23. The method of claim 18, further comprising the step of:
    focusing the reference beam substantially to a line which is substantially parallel to or coincident with an axis of the master cylindrical surface and substantially in a plane that is perpendicular to an optical axis of means focusing the beam.

24. The method of claim 18, further comprising the step of:
    focusing the reference beam substantially to a line which is substantially parallel to or coincident with an axis of the master cylindrical surface and substantially in a plane that is perpendicular to an optical axis of means focusing the beam and contains the axis of the master cylindrical surface.

25. The method of claim 18, further comprising the step of:
    expanding a beam of the radiation in one dimension forming a diverging fan beam; and
    collimating the diverging fan beam forming a collimated curtain beam for use as the reference beam.

* * * * *